United States Patent [19]

Aoki et al.

[11] Patent Number: 4,929,057

[45] Date of Patent: * May 29, 1990

[54] LIQUID CRYSTAL OPTICAL DEVICE

[75] Inventors: Kenji Aoki; Katsumori Takei; Haruo Nakamura; Yoshikazu Matsushita, all of Suwa, Japan

[73] Assignee: Seiko Epson Corporation, Tokyo, Japan

[ * ] Notice: The portion of the term of this patent subsequent to Jun. 9, 2004 has been disclaimed.

[21] Appl. No.: 366,228

[22] Filed: Jun. 12, 1989

Related U.S. Application Data

[63] Continuation of Ser. No. 159,453, Feb. 18, 1988, abandoned, which is a continuation of Ser. No. 947,796, Dec. 30, 1986, abandoned, which is a continuation of Ser. No. 838,876, Mar. 10, 1986, Pat. No. 4,671,616, which is a continuation of Ser. No. 733,400, May 13, 1985, abandoned, which is a continuation of Ser. No. 368,323, Apr. 14, 1982, abandoned.

[30] Foreign Application Priority Data

Apr. 15, 1981 [JP] Japan .................................. 56-56418

[51] Int. Cl.$^5$ .......................... G02F 1/13; G09G 3/02
[52] U.S. Cl. ................................ 350/333; 350/331 R; 350/332; 340/784; 340/713; 355/40
[58] Field of Search .................. 350/346, 331 R, 336, 350/332, 333; 340/784, 713; 355/71, 40, 41, 3 R

[56] References Cited

U.S. PATENT DOCUMENTS 4,386,836 6/1983 Aoki et al. .......................... 350/346

Primary Examiner—Stanley D. Miller
Assistant Examiner—Huy K. Mai
Attorney, Agent, or Firm—Blum Kaplan

[57] ABSTRACT

A liquid crystal optical device including a plurality of optical shutters is provided. The optical device includes a first glass substrate having N common electrodes disposed thereon and a second glass substrate having N signal electrodes disposed thereon, the glass substrates spaced apart and opposed to each other so that the electrodes are crossed. A liquid crystal material including a nematic liquid cyrstal having dielectric anisotropy which becomes 0 at a crossing frequency (fC) of 100 KHz or below at atmospheric temperatures including an optically active material encapsulated between the glass substrates. Polarizing plates are disposed on the outside of the liquid crystal panel and the device is driven in a N time-sharing mode by applying the driving signals to the common electrode and the signal electrodes. The optical device is particularly well suited for use in an optical printer in view of the rapid response times.

4 Claims, 13 Drawing Sheets

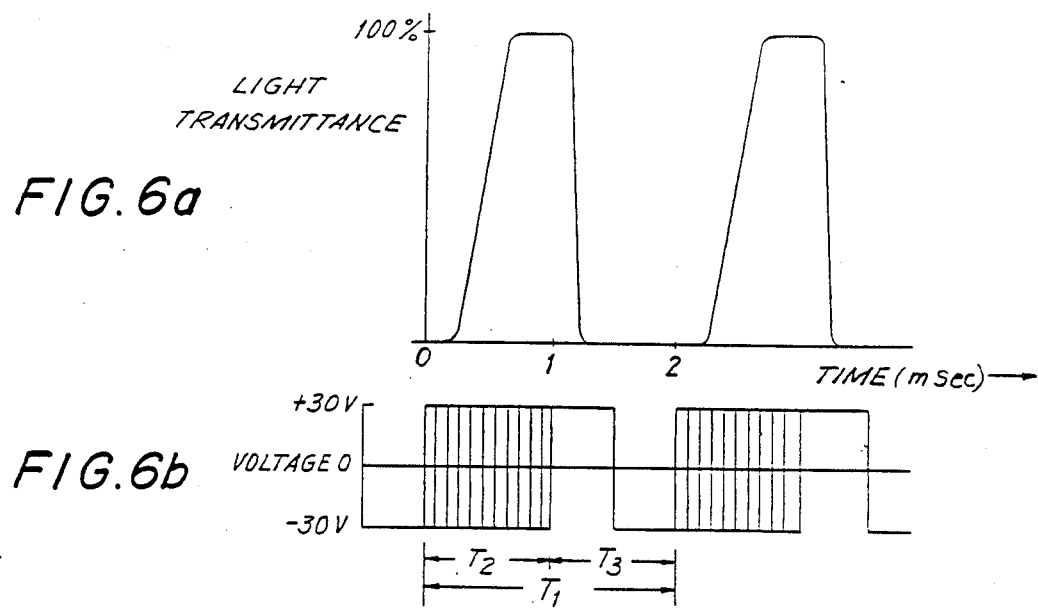
FIG. 6a
FIG. 6b
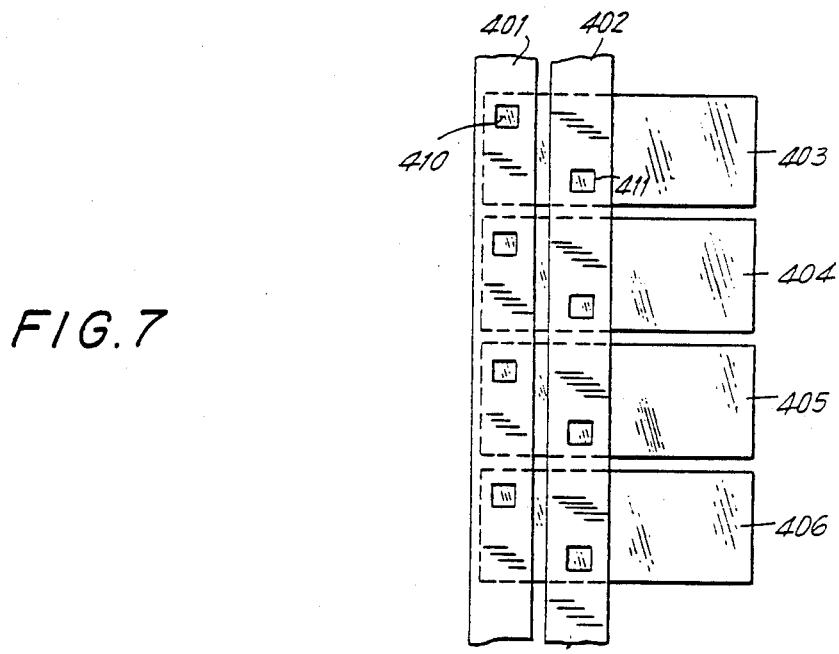
FIG. 7

FIG.19a     FIG.19b
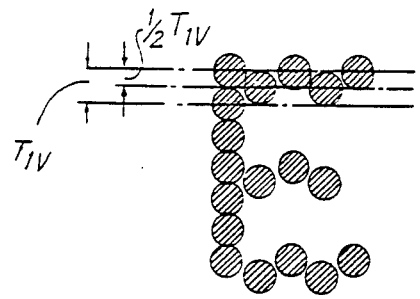
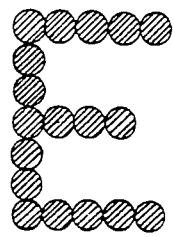
FIG.21
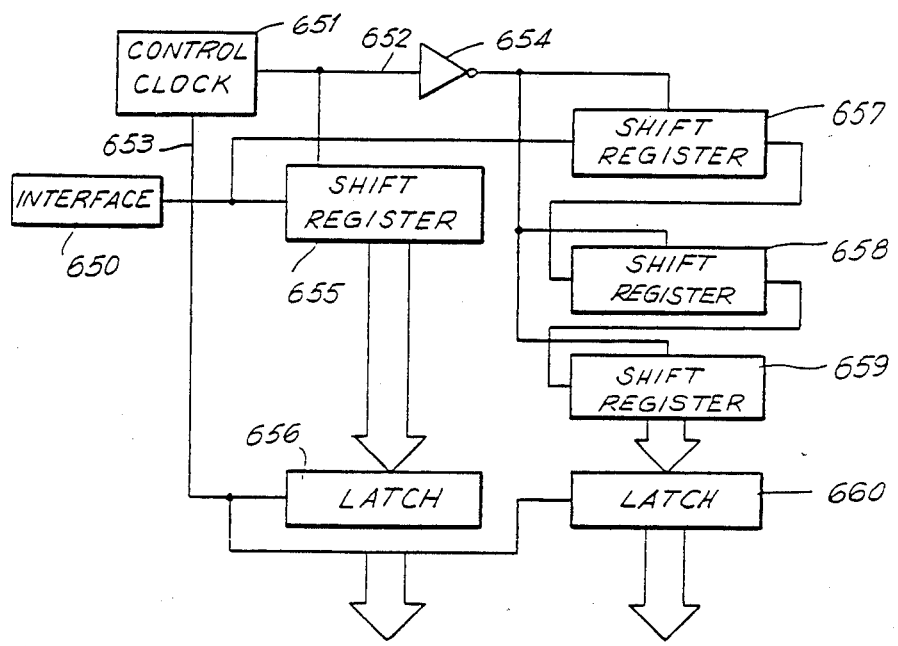

LIQUID CRYSTAL OPTICAL DEVICE

BACKGROUND OF THE INVENTION

This is a continuation of U.S. patent application Ser. No. 07/159,453, filed Feb. 18, 1988, now abandoned which is a continuation of U.S. patent application Ser. No. 06/947/796, filed Dec. 30, 1986, now abandoned, which is a continuation of U.S. patent application Ser. No. 06/838,876, filed Mar. 10, 1986, now U.S. Pat. No. 4,671,616 issued June 9, 1987, which is a continuation of U.S. patent application Ser. No. 06/733,400 filed on May 13, 1985, now abandoned, which is a continuation of U.S. patent application Ser. No. 06/368,323, filed on Apr. 14, 1982, now abandoned.

The invention relates to a liquid crystal optical device, and more particularly to a liquid crystal optical device having high-speed response characteristics. This high-speed response is obtained by utilizing a liquid crystal material obtained by adding an optically active material to a nematic liquid crystal which exhibits dielectric relaxation when a low frequency signal is applied thereto. In detail, the invention relates to a liquid crystal optical device wherein the liquid crystal material is driven in a time-sharing mode.

In recent years, information processing techniques have made remarkable advances. In view of these advancing techniques, various types of output devices, such as high-density and high-speed printing devices are required. In addition to high-speed, high-quality level printing is also required. In order to satisfy these above-mentioned needs, a laser-beam printer (LBP) or an optical fiber tube (OFT) printer using electrophotography and light writing has been placed into actual use on printing devices. However, the high price of both LBP and OFT prevent them from being widely accepted in spite of the strong demands for their outputs.

With this in mind, the present invention is aimed at providing a high-speed liquid crystal light valve which has been difficult to produce to date due to various problems. Such a light valve can be utilized in a light writing device of the type mentioned above. In addition, the circuit construction for driving the liquid crystal light valve can be simplified by improving the driving method which will permit cost to be reduced further. The use of liquid crystal display devices is also rapidly increasing. Thus, various studies of time-sharing drive for reducing the number of driving devices and the wiring costs are also under consideration. At the present time, time-sharing drive of about 1/16 duty has been attempted on a practical level. However, time-sharing drive of about 1/32 through 1/64 duty has only approached the experimental level.

Conventionally, the time-sharing drive of a liquid crystal is performed by the generalized A C amplitude selective multiplexing method based on the cumulative response effect. The largest duty N is determined by the ratio of ON voltage to OFF voltage by the following equation:

$$\alpha = (\sqrt{n} + 1/\sqrt{n} - 1)^{\frac{1}{2}}$$

Attempts by the present inventors are directed upon making $\alpha$ smaller and approaching 1; namely to make the threshold steep and obtain the desired results.

Presently, however, fluctuation of the threshold voltage depends upon thermal distribution within a liquid crystal panel of large volume. This fluctuation is larger than the threshold voltage width determined by $\alpha$. Thus, portions of poor quality occur within the panel when the thermal distribution differences within the panel are somewhat more than 2° C. This occurs even though the voltage is controlled precisely in accordance with the temperature deviation. In other words, the attempts for making $\alpha$ smaller and making N larger are meaningless when one considers the actual temperature distribution range under actual usage conditions. Accordingly, it would be desirable to provide a time-sharing drive which is different than the conventional time-sharing driving method which utilizes the generalized A C amplitude selective multiplexing method based on cumulative response effect. In other words, the present invention seeks to provide a method for increasing N as high as one desires, and which does not depend upon temperature deviation.

SUMMARY OF THE INVENTION

Generally speaking, a liquid crystal optical device including a first transparent plate having at least one common electrode and an opposed transparent plate disposed in confronting relation to the first-mentioned transparent plate and having a plurality of signal electrodes disposed thereon, a liquid crystal composition sealed between the transparent plates and polarizers disposed on each side of the liquid crystal panel is provided. The device includes N common metal electrodes each formed with a common transparent portion for forming N micro-shutters and M transparent signal electrodes on the second transparent plate extending to the region opposite the transparent portion of the common electrode. The liquid crystal composition sealed between the plates includes a nematic liquid crystal material having dielectric anisotropy which becomes 0 at a crossing frequency (hereinafter referred to as "$f_C$") of 100 KHz or below at ordinary temperatures, and includes an optically active material added to a nematic liquid crystal material. The polarizing plates disposed outside of the liquid crystal panel have their axes of polarization disposed at approximately 90° to each other. The micro-shutters are driven by a driving device in the N time-sharing mode wherein signals are applied to the common electrode and the signal electrodes, and optical switching between micro-shutters is completed within a writing cycle of N time-sharing drive. The liquid crystal composition preferably contains between about 2 and 10 weight percent optically active material. A preferred optically active material is a 4-(2-alkyl)-4'-cyanobiphenyl, such as a 4-(2-methylbutyl)-4'-cyanobiphenyls.

The micro-shutters are opened by application of a high frequency signal (hereinafter "$f_H$") which is higher than $f_C$ applied for an opening time portion of a writing period and closed by application of a low frequency signal (hereinafter "$f_L$") which is lower than $f_C$ for an unopened time portion of the writing period. In the time-sharing drive mode, common electrode signals for selecting the respective micro-shutters are applied to the common electrodes. Optical switching is completed within the time assigned for writing in the N time-sharing driving mode. The signals applied to the signal electrodes for opening and closing the shutters may be a high frequency signal of $f_H$ out of phase with the high frequency writing signal applied to the selected common electrode and the low frequency signal applied to the common electrode during the switching period is out of phase with a low frequency portion of the signal applied to the signal electrode during the switching portion of the writing period.

A printing device in accordance with the invention includes a light signal generator having a light source, a liquid crystal light valve including a liquid crystal optical device in accordance with the invention and the N time-sharing liquid crystal driving circuit, a photosensitive member, a developing section and a fixing section.

Accordingly, it is an object of the invention to provide an improved liquid crystal optical device.

It is another object of the invention to provide an improved liquid crystal optical device including an optically active material which exhibits dielectric relaxation at low frequencies for high-speed response.

It is a further object of the invention to provide high-speed light valves which may be opened and closed at high-speed within small writing periods of time.

Still another object of the invention is to provide an improved circuit for driving a liquid crystal optical device in a time-sharing driving mode.

Still a further object of the invention is to provide an improved light printing device including a liquid crystal light valve.

Still other objects and advantages of the invention will in part be obvious and will in part be apparent from the specification.

The invention accordingly comprises compositions possessing the characteristics, properties and relation of components which will be exemplified in the compositions described and the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6(a) illustrates the light transmittance characteristics of the liquid crystal material in response to the voltages applied thereto as shown in FIG. 6(b);

FIG. 7 is a top plan view of the electrode pattern of a liquid crystal light valve of two time-sharing drive constructed and arranged in accordance with the invention;

FIG. 19(a) illustrates a letter E printed by a liquid crystal optical device of the time-sharing drive without considering the arrangements of the micro-shutter;

FIG. 19(b) is a letter E printed by a device including a liquid crystal optical device of the type constructed and arranged in accordance with the invention;

FIG. 21 is a block circuit diagram of a signal dividing in accordance with the invention;

DESCRIPTION OF THE PREFERRED EMBODIMENTS

Figure 1:
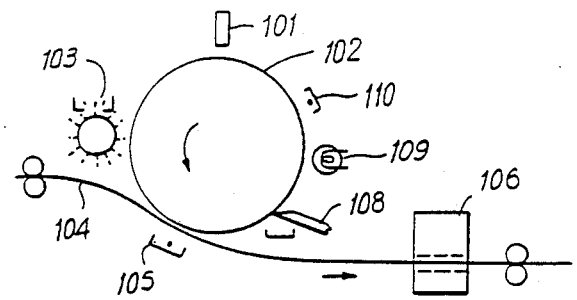
FIG. 1 is a schematic view of a printing device including a liquid crystal light valve constructed and arranged in accordance with the invention.

The characteristics of the structure of a printing device and a liquid crystal light valve constructed and arranged in accordance with the invention is as follows. FIG. 1 illustrates in schematic the structure of such a printing device. Latent images are light-written on a photosensitive drum 102 by means of a light generated in a light signal generator 101 including a liquid crystal light valve. Photosensitive drum 102 is charged by a corona charger 110. The light signal generated corresponds to the position of characters to be light-written. The electrostatic latent image is formed on drum 102 and is developed with toner by means of a magnetic brush developing device 103. Such developing usually provides a reverse image. The toner image is then transferred onto a paper 104 by means of a transferring corona discharge device 105 and is then fixed by means of a fixer 106. The toner image, residual on photosensitive drum 102 after transferring, is eliminated by a blade 108 and the electrostatic latent image is static-eliminated by a static eliminating lamp 109.

Figure 2:
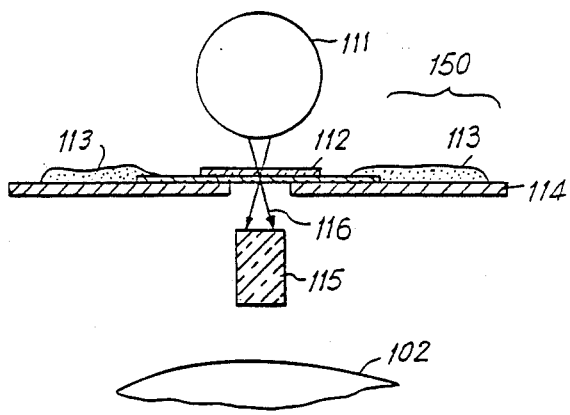
FIG. 2 is a schematic representation of the structure of the light signal generator and liquid crystal light valve of the printing device of FIG. 1.

FIG. 2 illustrates the structure of light signal generating section 101 in detail. Light signal generating section 101 includes a light source 111, such as a fluorescent lamp or the like, a liquid crystal light valve 150 and an image lens 115. Liquid crystal light valve 150 includes a liquid crystal panel 112 and a liquid crystal driving circuit 113 which is mounted on a mounting substrate 114. Light generated by light source 111 is modulated selectively by liquid crystal light valve 112. A light signal 116 focused through image lens 115 is imaged on photosensitive drum 102. The erecting image can be obtained by utilizing a SELFOC glass fiber lens array for focusing manufactured by Nippon Itagarasu Kabushiki Kaisha, as image lens 115.

Figure 3:
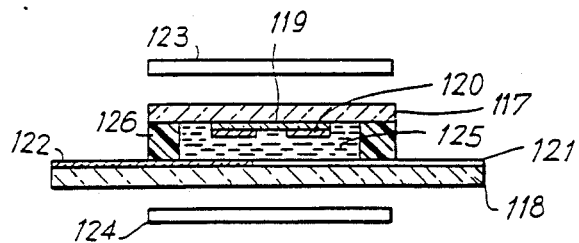
FIG. 3 is a cross-sectional view of the liquid crystal panel of the liquid crystal light valve of FIG. 2.
Figure 4:
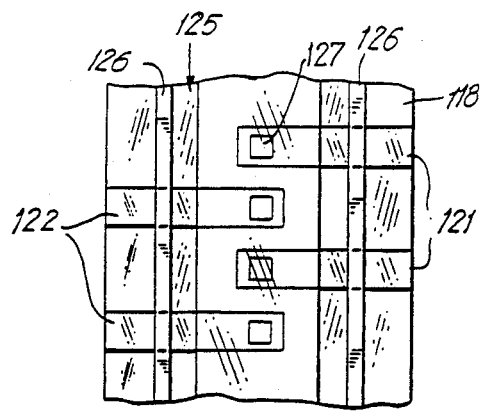
FIG. 4 is a top plan view of the liquid crystal light valve of FIG. 3.

FIGS. 3 and 4 illustrate the structure of liquid crystal panel 112 in greater detail. Liquid crystal panel 112 includes a first transparent substrate 117 having a common electrode which is composed of a transparent electrode 119 disposed on the interior surface thereof, and an opaque electrode 120 disposed on transparent electrode 119 and a second lower transparent substrate 118 having two signal electrodes 121 and 122 disposed on the interior surface thereof. A spacer 126 maintains substrate 117 apart from substrate 118 and encapsulates a liquid crystal composition 125 sealed between the respective plates. A pair of polarizing plates 123 and 124 are disposed on the outer surfaces of transparent substrate 117 and 118.

First common electrode 119 is transparent and common second electrode 120 is metal and optically opaque formed with opening for forming an optical shutter region 127. Signal electrodes 121 and 122 disposed on second transparent substrate 118 are transparent electrodes. Polarizing plates 123 and 124 are positioned so that the polarizing planes are disposed orthogonally with respect to each other By this arrangement, light is modulated in the micro-shutter section comprising transparent optical shutter region 127 of common electrode 119 on first upper transparent substrate 117 and transparent signal electrodes 121 and 122 disposed on second lower transparent substrate 118.

A high-speed liquid crystal light valve can be obtained by utilizing a high-frequency cholesteric liquid crystal material. Such material is obtained by adding an effective amount of an optically active material to a nematic liquid crystal composition. Such optically active materials are 4-(2-alkyl)-4'-cyanobiphenyls and may be present in amounts between about 1 and 10 weight percent and preferably between about 2 and 5 weight percent and most preferably 3 weight percent. The preferred optically active material is a 4(2-methylbutyl)-4'-cyanobiphenyl. The nematic liquid crystal composition is of the type described in Japanese application No. 55-141,085, and preferably the type illustrated in Table 1 of that specification.

Figure 5:
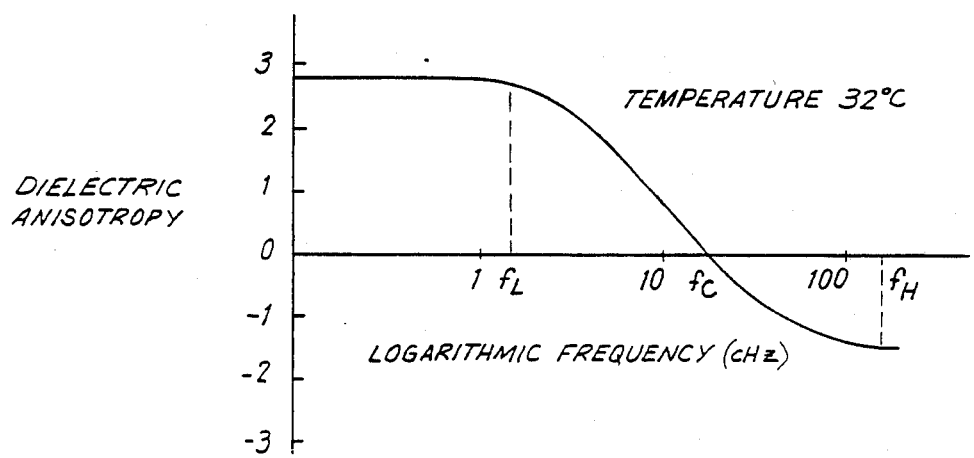
FIG. 5 is a graph illustrating the frequency characteristics of dielectric anisotropy of a liquid crystal material wherein dielectric anisotropy is reversible and utilized in the invention.

The frequency-dielectric anisotropism characteristic of the above-described liquid crystal compositions are illustrated in FIG. 5. The frequency at which the dielectric anisotropism is 0 is identified as a "cross frequency" or "critical frequency" and is represented as "$f_C$". A lower frequency and $f_C$ is represented as $f_L$ and a frequency higher than $f_C$ is represented as $f_H$. The liquid crystal light valve is operated by applying signals having frequencies $f_L$ and frequencies $f_H$ to the common and signal electrodes, respectively. A further example of a liquid crystal composition exhibiting this is WI liquid crystal obtainable from Merck and others as described in British Patent Specification No. 1,410,161.

FIG. 6(b) illustrates a voltage applied to a liquid crystal light valve in accordance with the invention and FIG. 6(a) illustrates responsive light transmittance to that signal through the liquid crystal light valve. A signal of $f_H$ applied for a period $T_2$ and a signal of $f_L$ is applied for a period $T_3$. $T_1$ is a writing period, $T_2$ is an open time period and $T_3$ is an unopened time period of the light valve. The liquid crystal light valve is opened by applying a signal of $f_H$ and closed by applying a signal $f_L$ to the signal electrode.

By constructing a liquid crystal light valve in this manner, an extremely high-speed liquid crystal light valve is provided. However, in order to print high-quality print, it is necessary to position micro-shutters at a high-density, such as ten (10) per 1 mm. Thus, in the case of printing in A4 format, it is necessary to provide micro-shutters in a 20 cm width and a total of 2,000 micro-shutters would be required. Therefore, 2,000 signal electrodes, 2,000 driving circuits and 2,000 mounting terminals are required. This presents significant production difficulties so that yield is significantly reduced and the cost per light valve increases. In accordance with a first embodiment of the invention, the number of signal electrodes necessary can be reduced greatly by utilizing a time-sharing drive in accordance with the invention.

Figure 8:
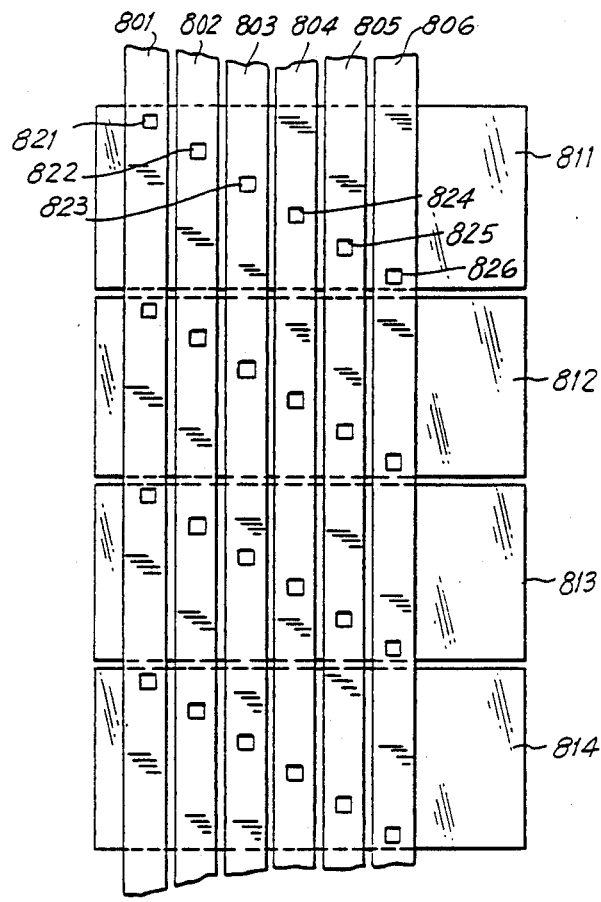
FIG. 8 is a top plan view of the electrode pattern of a liquid crystal light valve of six time-sharing drive constructioned and arranged in accordance with the invention.

FIGS. 7 and 8 are illustrative examples of the electrode structures of liquid crystal light valves which may be utilized in accordance with this embodiment of the invention. FIG. 7 shows an example of a two (N=2) time-sharing drive and FIG. 8 illustrates an example of a six (N=6) time-sharing drive. These examples of two time-sharing drive and of six time-sharing drive will be explained here; however, naturally the invention can be applied to N (N is an integer of at least equal to or more than 2) time-sharing drive.

The example of the N=2 time-sharing drive illustrated in FIG. 7 will now be described in detail. In such a structure, the electrode pattern is characterized in that each common electrode is divided into two electrodes 401 and 402 and signal electrodes, 403 through 406 being illustrated cross common electrodes 401 and 402 and two micro-shutters, such as micro-shutters 410 and 411 are formed on each signal electrode. In FIG. 7, two common electrodes are shown, however any number M (an integral number) may be utilized. For example, in FIG. 8 the example of N=6 time-sharing drive where the common electrodes are divided into six electrodes 801 through 806. Each six electrodes 801 through 806 cross signal electrodes 811 through 814 and six micro-shutters, such as micro-shutters 821 through 826 are formed on each signal electrode 811 through 814.

As noted above, in the case of N time-sharing drive, the electrode pattern includes M signal electrodes having N common electrodes and N micro-shutters on each signal electrode. Thus, the electrode pattern includes M×N micro-shutters total.

Figure 9:
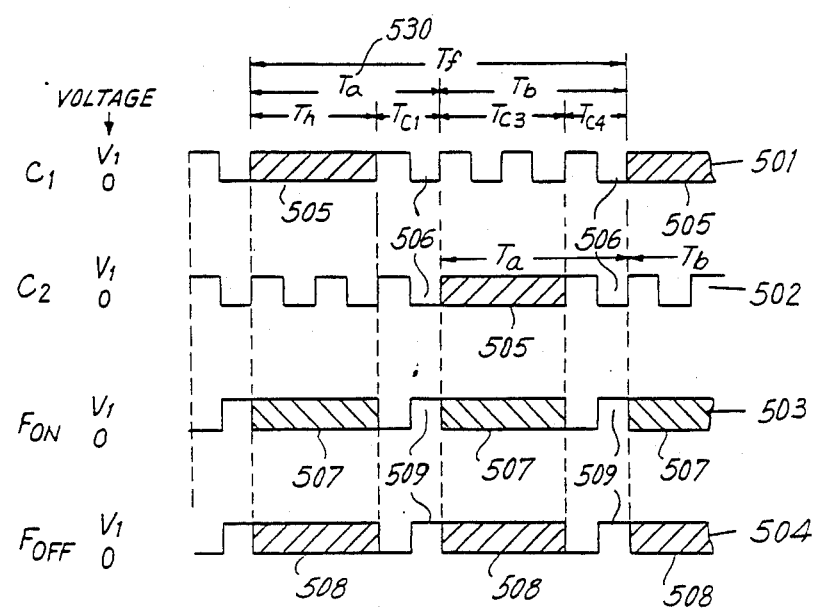
FIG. 9 illustrates the driving signals applied to the common electrode and signal electrodes for driving in time-sharing in accordance with one embodiment of the invention.

The method for driving the liquid crystal light valve will now be described for the example N=2 time-sharing drive. FIG. 9 illustrates the waveform of two common electrode $C_1$ and $C_2$ driving signals for the N=2 time-sharing drive and an ON signal ($F_{ON}$) and an OFF ($F_{OFF}$) signal to be applied to the signal electrodes signal for opening and closing the respective micro-shutters. Such signals are used for driving the display in accordance with the invention.

$C_1$ signal and $C_2$ signal are common electrode signals 501 and 502, respectively applied to common electrodes 401 and 402 of FIG. 7. $T_f$ in $C_1$ signal 501 is a writing period and corresponds to time $T_1$ in FIG. 6. $T_a$ is the time assigned for writing and is $\frac{1}{2}$ of the period of $T_f$. $T_b$ is the non-assigned time for writing and is $\frac{1}{2}$ of the period of $T_f$ in the case that N=2 time-sharing drive. In $C_1$ signal 501, signal $f_H$ is applied during period $T_h$ and signal $f_L$ is applied during period $T_{C1}$, $T_{C3}$ and $T_{C4}$. $C_2$ signal 502 is delayed from $C_1$ signal 501 by Tf/2. Thus, the period of $T_h = T_{C3}$ and $T_{C1} = T_{C4}$.

$F_{ON}$ is opening signal 503 and $F_{OFF}$ is closing signal 504 applied to signal electrodes 403 through 406 for opening and closing micro-shutters 410 and 411, respectively. A signal portion 507 in $F_{ON}$ and signal portion 508 in $F_{OFF}$ are of a high frequency $f_H$. Signal portions 509 are of a low frequency $f_L$. Signal portion 505 of high frequency $f_H$ of common electrode signals $C_1$ and $C_2$ for writing are in phase with the phase of high frequency signal portion 508 of $F_{OFF}$ and out of phase with the high frequency portion 507 of $F_{ON}$. Additionally, low frequency signal portions 506 of common electrode signals $C_1$ and $C_2$ for writing are out of phase with low frequency signal portions 509 of signals $F_{ON}$ and $F_{OFF}$. In the time-sharing driving method as described in accordance with the invention, the phasing of the low frequency portions of the signals is most important Low frequency signal portions 506 applied in $C_1$ and $C_2$ common electrode signal 501 and 502 are out of phase with low frequency signal portions 509 applied in $F_{ON}$ and $F_{OFF}$.

Figure 10:
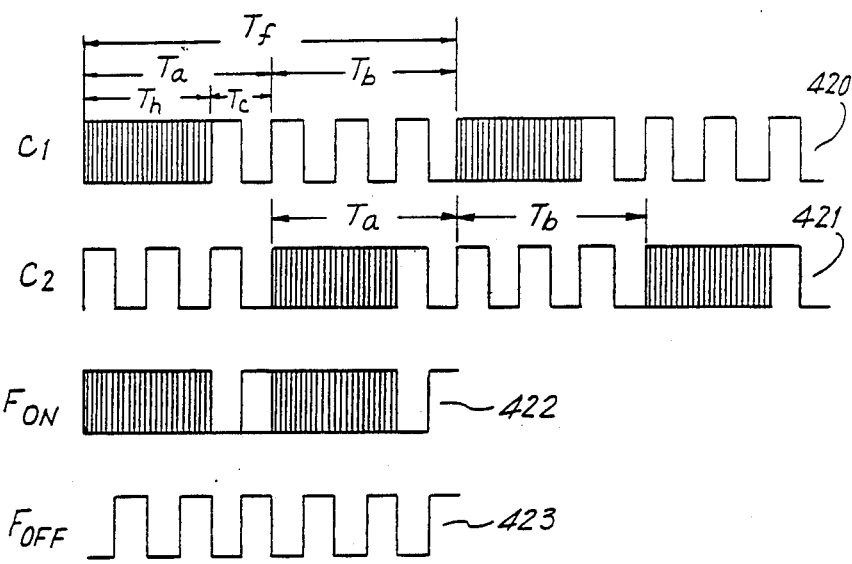
FIG. 10 is a further embodiment illustrating the driving signals applied to the common electrode and signal electrodes for driving in time-sharing in accordance with the invention.
Figure 11A:
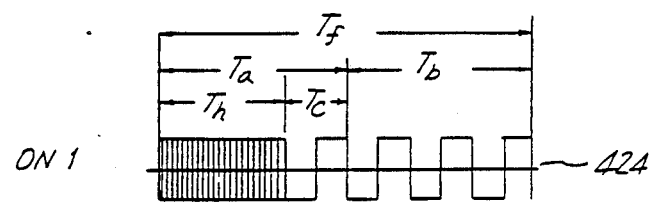
FIG. 11 illustrates the voltage waveforms applied to the micro-shutters in response to the signals illustrated in FIG. 10.
Figure 11B:
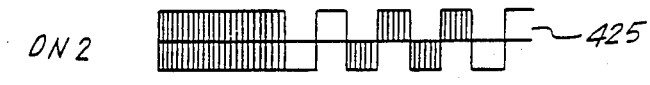
Figure 11C:
Figure 11D:
Figure 12A:
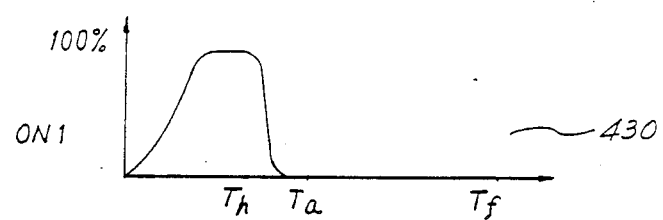
FIGS. 12(a), (b), (c) and (d) illustrate the light transmittance of the liquid crystal material in response to the applied waveforms illustrated in FIG. 11.
Figure 12B:
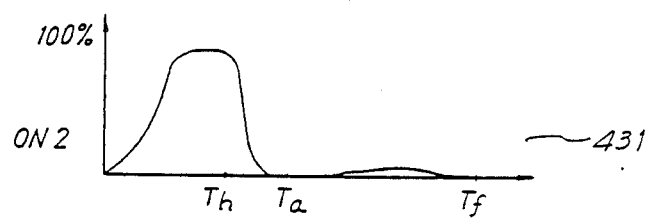
Figure 12C:
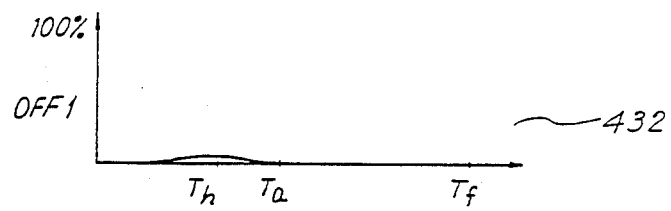
Figure 12D:
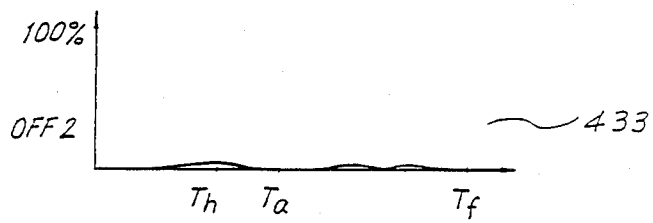

Another example of the driving signals applied to the signal electrode side will now be described. As shown in FIG. 10, an opening signal $F_{ON}$ 422 for opening a micro-shutter and a closing signal $F_{OFF}$ 423 for closing a micro-shutter. $F_{ON}$ and $F_{OFF}$ are each one-half the period (Ta or Tb) of common electrode signal $C_1$ or $C_2$. Opening signal $F_{ON}$ is formed of a high frequency portion which is as long as ($T_h$) high frequency portion of $C_1$ (or $C_2$) and is opposite in phase. The low frequency portion of opening signal $F_{ON}$ is opposite in phase to the low frequency portion of $C_1$ (or $C_2$). Closing signal $F_{OFF}$ is formed of solely a low frequency portion which is opposite in phase to low frequency ($f_1$) portion of common electrode signal $C_1$ (or $C_2$).

FIGS. 11(a), 11(b), 11(c) and 11(d) illustrate the voltage waveforms applied to micro-shutters 410 and 411 at the time $C_1$ common electrode signal 420 and $C_2$ common electrode signal 421 are applied to common electrodes 401 and 402, respectively, and $F_{ON}$ 422 or $F_{OFF}$ 423 are applied to signal electrodes 403 through 406 in accordance with the data. FIGS. 12(a), 12(b), 12(c) and 12(d) illustrate the optical transmission properties of micro-shutters 410 and 411 in response to the applied waveforms which correspond to the waveforms in FIGS. 11(a), 11(b), 11(c) and 11(d). The abscissa axis in the FIG. 12 graphs represent time. $T_h$, $T_a$ and $T_f$ of the FIG. 12 graph correspond to $T_h$, $T_a$ and $T_f$ of the voltage waveforms in FIG. 11. The ordinate axis of the FIG. 12 graphs illustrate light transmittance of micro-shutters 410 and 411, assuming that the light transmittance is 100 percent (%) at the time the two polarizing plates are superimposed with their axis parallel. The results shown in FIG. 12 are obtained when $f_H$ is 130 KHz, $f_L$ is 5 KHz, the applied voltage is 30 V, $T_f$ is 2 msec., $T_a$ is 1 msec. and $T_b$ is 0.7 msec.

The optical transmission property curves 430, 431, 432 and 433 in FIG. 12 correspond to the applied voltages 424, 425, 426 and 427 illustrated in FIG. 11, respectively. The driving method in accordance with the invention is a $\frac{1}{2}$ time-sharing drive. Thus, there are four types of waveforms which are applied to the signal electrodes during one repeated period as follows.

For example, in the case of signal electrodes 403, micro-shutters 410 and 411 may be in one of four situations of ON-OFF, ON-ON, OFF-OFF and OFF-ON, which correspond to waveforms 424, 425, 426 and 427, respectively as shown in FIG. 11. As stated above, two kinds of applied voltages of ON and OFF exist with respect to one micro-shutter. However, in the liquid crystal material utilized in this invention, the difference between the light transmittance in response to two types of the applied voltages of ON and OFF can be ignored for practical purposes as illustrated in FIGS. 12(a), 12(b), 12(c) and 12(d). In other words, it can be considered that there is no difference in the light transmittance in accordance with signal voltages 424 and 425 and that there is no difference in light transmittance as to the OFF signal voltages 426 and 427.

In accordance with the invention, the liquid crystal device is utilized as a micro-shutter. Therefore, it is most important that the shutter is completely closed in the OFF state. In the driving method in accordance with the invention as described, light can be almost complete cut off when the shutter is in the OFF state.

Figure 13:
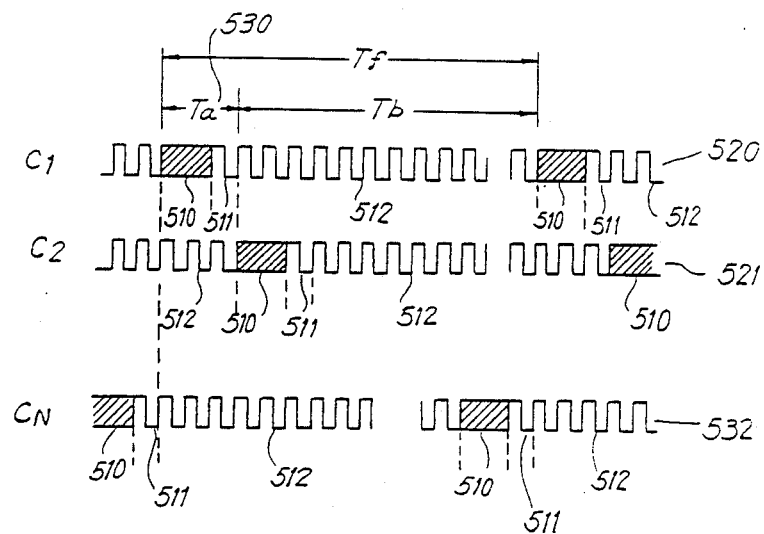
FIG. 13 illustrates the driving signals applied to the common electrodes for driving in N time-sharing in accordance with the invention.

A further example of an N time-sharing driving method will be explained with reference to FIG. 13. This example differs from the case wherein N=2 as regards the assigned time for writing which is Ta=Tf/N. A first selected $C_1$ signal for writing 520 is formed of assigned time $T_a$ for writing and non-assigned time $T_b$. $T_a$ is formed of a high frequency signal 510 of $f_H$ and a low frequency signal 511 of $f_L$. A second selected signal $C_2$ for writing 521 is a signal which is delayed from $C_1$ by a time Tf/N, and an Nth selective signal $C_N$ for writing 532 is a signal delayed by a time ((N×1)/N)×$T_f$.

Figure 14:
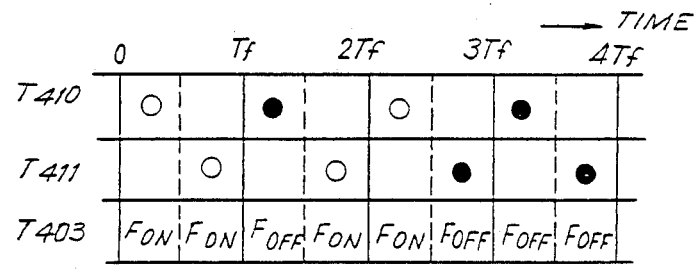
FIG. 14 is a time chart illustrating the state of the micro-shutters in a liquid crystal light valve as illustrated in FIG. 7 in response to application of driving signals as illustrated in FIG. 9.

A specific method for switching a liquid crystal light valve in accordance with invention will be described to the driving method wherein N=2. In this example, signals 501 and 502 as shown in FIG. 9 are applied to writing selective common electrodes 401 and 402 as shown in FIG. 7, respectively. Micro-shutters 410 and 411 are switched in accordance with time charts $T_{410}$ and $T_{411}$ as shown in FIG. 14. A white dot corresponds to opening and a black dot corresponds to shutting of one of the micro-shutters. Signals $F_{ON}$ and $F_{OFF}$ are changed over and applied to signal electrode 403 as shown in $T_{403}$ in order to open and close the micro-shutter as shown in FIG. 14. The voltages applied to micro-shutters 410 and 411 are shown in applied voltages $S_{410}$ and $S_{411}$ of FIG. 15, respectively, by combining the above-noted signals with $C_1$ (401) and $C_2$ (402).

The light transmittance response of micro-shutter 410 is illustrated by a solid line 610 in the lower portion of the chart and a light transmittance response 620 of micro-shutter 411 is shown by an open line 611. A voltage 601 of high frequency $f_H$, a voltage 602 of low frequency $f_L$, a voltage 603 wherein $f_L$ and $f_H$ are superimposed and a voltage 604 wherein the applied voltage is 0 represents the voltages applied to the liquid crystal.

In the following example, signals having the same waveforms as described above are identified by the same reference numeral. Light transmittance response 620 illustrates the response characteristics of a micro-shutter as follows. In response to the opening signals applied to micro-shutters 410 and 411, the response is illustrated by curves 610 and 611. Curve 610 illustrates opening in response to voltage 601 of high frequency $f_H$ and closes in response to application of voltage 602 of low frequency $f_L$. In other words a shutter opens and shuts during time Ta assigned for writing and driving signal $C_1$ and shown in light transmittance responses 610 and 611. In response to shutter closing signals, response characteristic 612 and 613 of minimal transmitance are obtained. As curves 612 and 613 illustrate, the micro-shutter begins to open slightly in response to application of voltage waveform 604 of 0 voltage, but closes in response to voltage 602 of low frequency $f_L$. Thus, the closed state of a micro-shutter can be maintained at this time. Moreover, the micro-shutters are maintained closed in response to voltage 603 wherein signals of low frequency $f_L$ and high frequency $f_H$ are superimposed.

Figure 15:
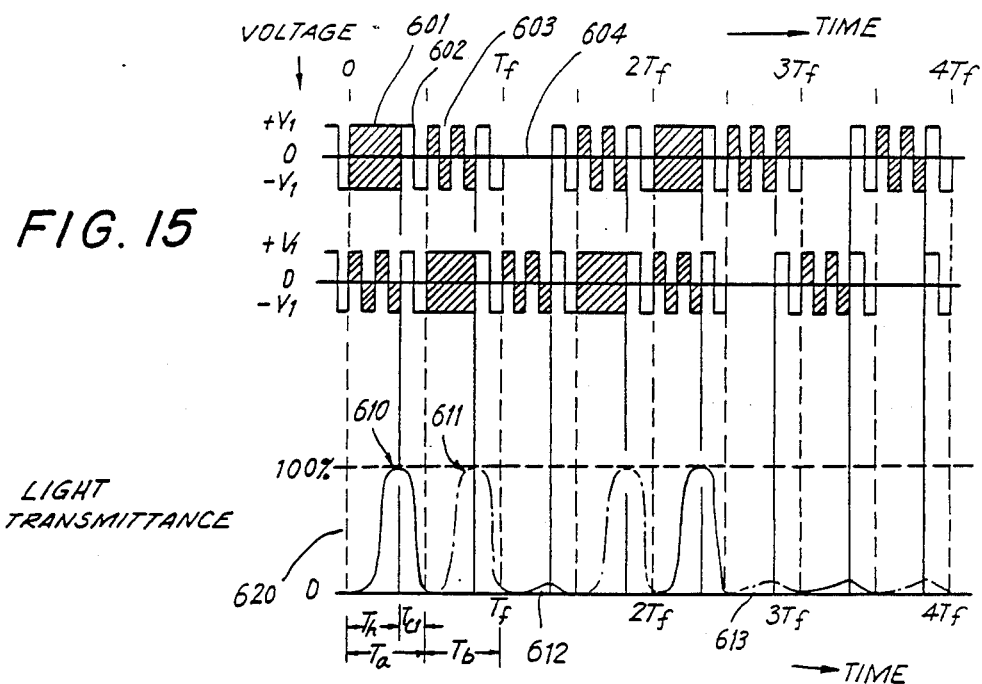
FIG. 15 illustrates the voltage waveforms applied to the micro-shutters in the liquid crystal light valve of FIG. 7 and the resultant light transmittance characteristics.

Light transmittance response 620 as illustrated in FIG. 15 can be obtained by utilizing a liquid crystal material in accordance with the invention wherein voltage $V_1$ is 30 V at 35° C., the writing period $T_f = 2$ msec., the open time $T_h = 0.8$ msec. and $T_{C1} = 0.2$ msec.

Accordingly, the driving method and the response characteristics of a micro-shutter constructed in accordance with the invention has been described. The features obtained in accordance with the invention will now be explained. The distinctive liquid crystal light valve in accordance with the invention could not be fabricated from a liquid crystal element known in the prior art, but can be obtained by utilizing the above described liquid crystal material and a time-sharing driving method in accordance with the invention. The above described liquid crystal material is composed of a nematic liquid crystal including an optically active material, namely a cholesteric liquid crystal material exhibiting dielectric relaxation in the low-frequency range. The most important characteristic of the invention is that the relaxation response can be completed within the assigned time for writing $(T_a)$, by providing a time for applying a low-frequency signal portion (602), thereby making the complete time-sharing drive available. Keeping this in mind, it is important that signal portions 506 and 509 of low frequency $f_L$ be out of phase with each other as shown in FIG. 9. In addition, a low frequency signal of $f_L$ can be used in place of signal portion 508 of high frequency $f_H$.

Figure 16:
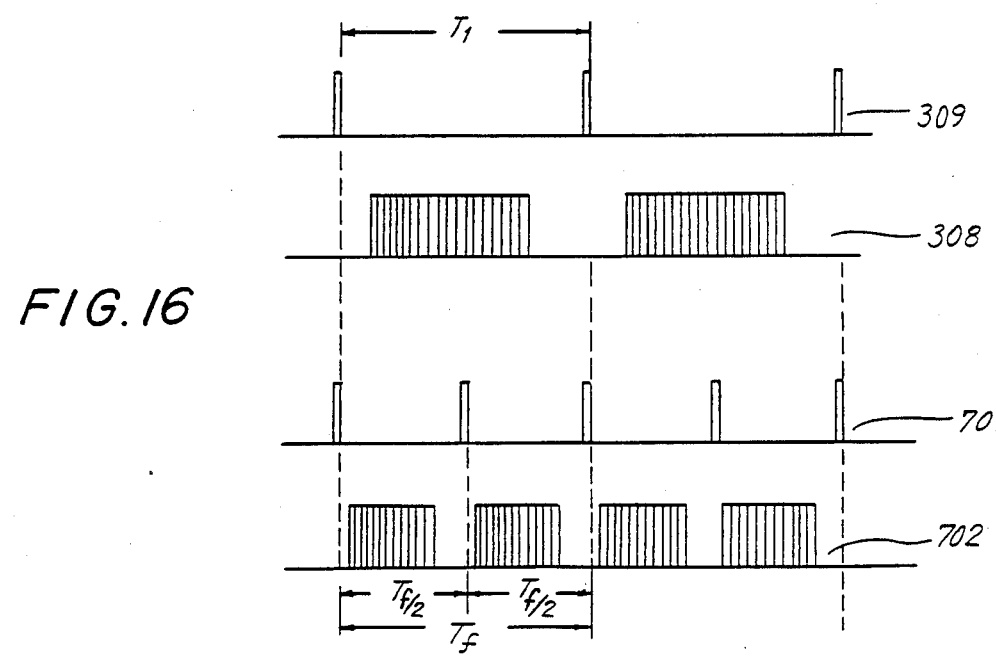
FIG. 16 is an illustration of the data signals and timing signals applied to the static drive and time-sharing drive.

The driving circuit and the signal transmission method for driving the liquid crystal light valve and the arrangement of the micro-shutters will now be explained. In this respect, the time-sharing drive method in accordance with the invention is different from the conventional static driving method. Specifically, in a static drive as illustrated in FIG. 16, the data of one line is transmitted by a clock 308 during a writing period $T_f$ and is latched onto the term of a latch 309. On the other hand, in the time-sharing drive in accordance with the invention, the data of one line is divided into halves and the data is transmitted by a clock 702 in periods $T_f/2$. This is half of a writing period $T_f$ in the way the data corresponds to the selecting times of common signals $C_1$ and $C_2$, respectively. Then the data is latched in the period of latch 701 and is written. Therefore, the respective micro-shutters are operated by changing over the switch twice during one writing period $T_f$.

In the case of writing by time-sharing in the aperture construction shown in FIG. 4, the positions of the micro-shutters are shifted by one-half pitch in the direction of the photosensitive material between the portion written in the first half and the portion written in the second half of a writing period. If not, a straight line in a direction transverse to the print line cannot be written.

Figure 17:
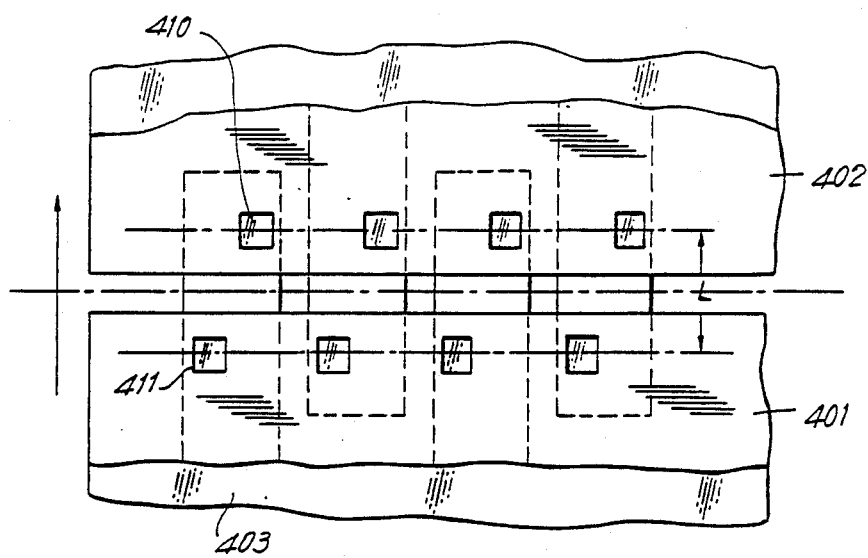
FIG. 17 is a partial plan view of a liquid crystal optical device constructed and arranged in accordance with the invention.
Figure 18:
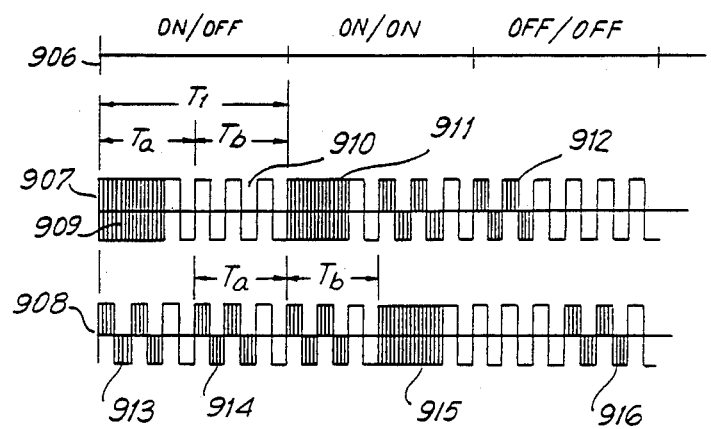
FIG. 18 are voltage waveforms applied to the liquid crystal optical device of FIG. 17.

As shown in FIG. 17 common signal $C_1$ is applied to common electrode 401 and common signal $C_2$ is applied to common electrode 402, and signal electrode 403 and micro-shutters 410 and 411 are positioned and driven as described immediately above. The photo-sensitive material is transferred in the direction shown by the arrow, the direction from shutter 411 to shutter 410. When a signal 906 in FIG. 18 is applied to signal electrode 403 in accordance with this method, the voltage waveforms which are actually applied to micro-shutters 411 and 410 by combining common signals $C_1$ and $C_2$ are shown as voltage waveforms 907 and 908, respectively. Voltage waveforms 909 and 914 represent the period selected by common signals $C_1$ and $C_2$. Voltage waveforms 910 and 913 represent the nonselected periods. The signal waveforms 909, 911, and 912 represent the waveforms of ON, ON and OFF, respectively. Voltage waveform portions 914, 915 and 916 are the voltage waveforms of the OFF, ON and OFF signals, respectively. The interval between micro-shutters 411 and 410 is represented by a distance L, the writing cycle time is represented as $T_1$ which is equivalent to the repetitive writing period $T_f$ in the earlier described embodiment and the transferring speed of the photo-sensitive material is represented as v. For the case where $L=0$ and a straight line is written in the transverse direction, the micro-shutters positioned side-by-side turn ON, but micro-shutters which are positioned on the same signal electrode, for example 411 and 410, turn ON during the periods 911 and 915, respectively. As waveform 915 is shifted from waveform 911 by a time $\frac{1}{2} T_1$ and the photo-sensitive material proceeds by $\frac{1}{2} T_1 v$. Thus, two dots are shifted in the preceding direction by $\frac{1}{2} T_1 v$.

Figure 20:
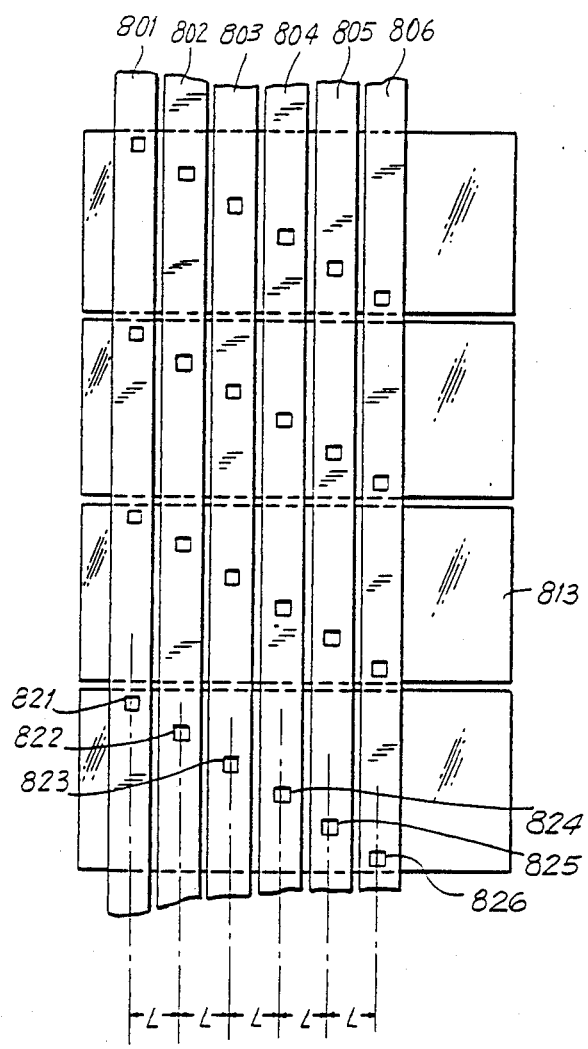
FIG. 20 is a top plan view of a liquid crystal optical device constructed and arranged in accordance with the invention.

Referring to FIG. 19(a) an illustration of printing with the shifted dots is shown. As switching from one micro-shutter to another occurs at time $T_1$, the dots are formed with a pitch $T_1 v$ on the photo-sensitive material. An adjacent dot is necessarily shifted by a distance $\frac{1}{2} T_1 v$, namely one-half pitch. Therefore, in order to print dots without dispersion and in a straight line as shown in FIG. 19(b), the micro-shutters must be shifted by a distance As described above, L is optional if $L=(m+\frac{1}{2}) T_1 v$. When m is an integer, the adjoining dots are shifted by $1/n T_1 v$ in the case of $1/n$ time-sharing. Thus, as shown in FIG. 20, the respective intervals L of adjoining micro-shutters 821 through 826 on n common electrode is represented as $L=(m+1/n) T_1 v$. In the formula, v is the transferring speed of the photo-sensitive surface, $T_1$ is the period of time for writing and m is an integer equal to or greater than 2. Common signal electrodes are designated 801 through 806 and four signal electrodes are designated 811 through 814 as in FIG. 8.

In this example, a writing period $T_1$ is 2 msec. with $\frac{1}{2}$ time-sharing drive. The speed of photo-sensitive material is represented as $v=5$ cm/s and $m=2$ in view of the ease for forming such a panel given the surface area of the micro-shutter and other characteristics. Thus, $L=250$ μm. In this case, it is necessary to delay the dots for two lines so that a data point is delayed and written in order to match the written dot of the data of an adjoining dot.

FIG. 21 shows a block circuit diagram for providing the signals for delaying the data in this manner. Signal data from an interface 650 are input into a first shift register 655 and a second shift register 657 by the control of a clock pulse 652 from a control clock 651 and an inverted pulse from an inverter 654. Data which has been stored in first shift register 655 is applied to a latch circuit 656 by a latch signal 653. Data stored in second shift register 657 passes through a third shift register 658 and a fourth shift register 659 and is then applied to a second latch circuit 660. Pursuant to this circuit, the data on one electrode is delayed by two printing lines.

As noted above, printing in accordance with such an arrangement of micro-shutters in accordance with the invention avoids fluctuation of images, when light writing unit includes a liquid crystal light valve driven in a time-sharing driving mode. Thus, fluctuation of images can be reduced so that a high level of printing quality can be obtained.

Figure 22A:
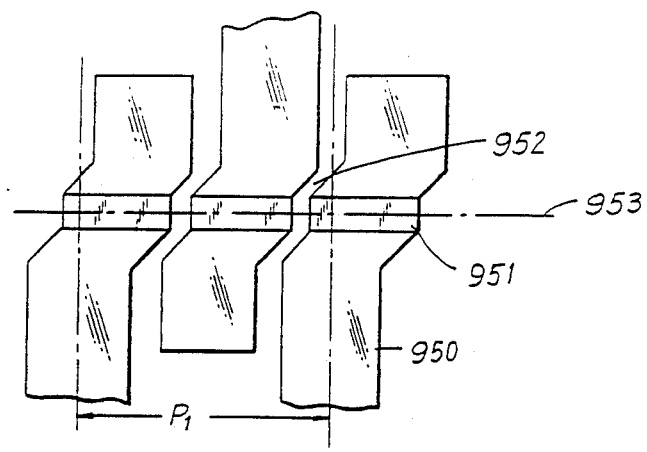
FIG. 22(a), (b) and (c) illustrates steps in the construction of electrodes for the optical devices prepared in accordance with the invention.

Referring specifically to FIG. 22, the electrode pattern of an illustrative liquid crystal panel in accordance with the invention is shown as an example. The showing in FIG. 22(a) illustrates a signal electrode 950 formed on second transparent plate 118 having opaque portion 951 formed from metal films. Thus, portion 951 is opaque to light and prevents light from being transmitted. The remaining portions of signal electrode 950, except for opaque portion 951, are transparent electrodes. The terminal portion of signal electrode 950 is elongated in a direction perpendicular to a center line 953 drawn between the opaque portion of adjacent signal electrodes. The pitch $P_1$ between adjacent signal electrodes 950 on one side is 400 μm and there are 500 electrodes on one side. Thus, the reliability of wiring the electrode terminals of a high-density device can be improved in accordance with this construction. A space 952 between adjacent signal electrodes 950 in the region of center line 953 is 10 μm.

Figure 22B:
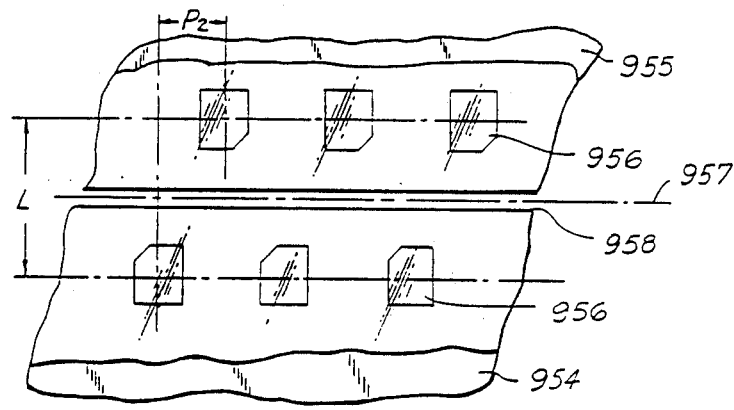

FIG. 22(b) illustrates common electrodes 954 and 955 formed on first transparent plate 117. Common electrodes 954 and 955 are disposed symmetrically with respect to a center line 957 with a spacing 958 between the electrodes of 10 μm. Common electrodes 954 and 955 in the regions illustrated with oblique lines are of metal and thus opaque to light. A plurality of apertures form micro-shutters 956 which are formed by a transparent electrode film of common electrodes. Two thousand micro-shutters 956 are formed with a zig-zag pattern of 100 μum pitch. (1,000 micro-shutters are positioned in 200 μm pitch on one side).

Figure 22C:
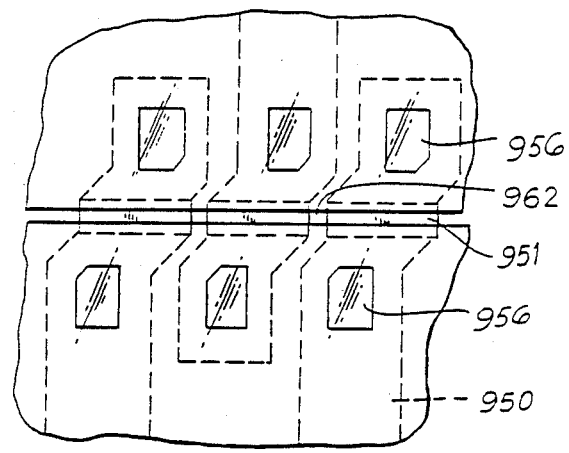

FIG. 22(c) shows transparent plates 117 and 118 in overlapped relation so that center lines 953 and 957 are aligned. Light approaching a liquid crystal light valve formed from plates 117 and 118 will have light shut off by opaque metal portions of common signal electrodes 954 and 955 shown with oblique lines and the light striking micro-shutters 961 will be modulated selectively.

It is undesirable that there be any light leakage from any portion of the device except when micro-shutters 956 and 959 are opened. Any such leakage provides a noise background. However, light leakage from spacing 958 between two common signal electrodes 954 and 955 is inevitable. Therefore, regions of leakage should be minimized to the level of not presenting a practical problem by masking opaque portion 951 of signal electrode with metal in order to reduce light leakage to a minimum so as not to interfere with the device as a practical matter. In addition, it is advantageous during manufacturing such a light panel that the interval between signal electrodes reach a minimum at opaque region 951 where signal electrode intersects center line 957 of common electrodes thereby forming light leakage portions 962 of more limited area. This permits an increase margin of error when combining second transparent plate 118 with first transparent plate 117 by making signal electrode 950 the transparent electrode, except for opaque portion 951. Thus, the yield from manufacturing the light valves can be increased.

In the case of $\frac{1}{2}$ time-sharing drive, interval L as shown in FIG. 22(b) between two rows of micro-shutters 956 and 959 arranged in the form of a zig-zag pattern is limited by the writing speed and the transferring speed of the photo-sensitive material in order not to shift the printed dots by a one-half pitch, namely the pitch in the transferring direction of the photo-sensitive material of the printed dot. In this example, the dot is written with 100 μm pitch so that $L=250$ μm. Thus, it is sufficient to delay the data on one side of the microshutter by two lines and the margin of error for assembling the panels increases.

Figure 23:
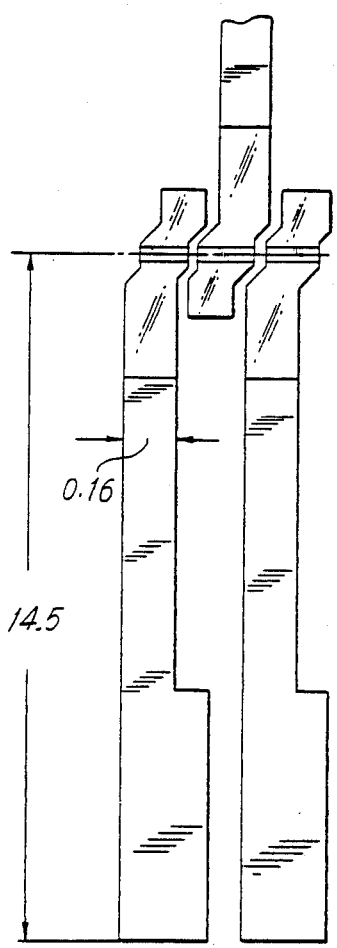
FIG. 23 is a top plan view of a signal electrode constructed and arranged in accordance with the invention.

FIG. 23 illustrates in plan view an entire signal electrode. The dimensions are set forth in millimeters. If an electrode as in this example were formed of transparent material solely, the impedance of the terminal would increase to the point where it could not be ignored. Therefore, as illustrated in FIG. 23, a metal film is utilized for forming the portions away from the light valve regions at the terminals in order to reduce the impedance of the electrodes.

It has been confirmed that the shape of the electrodes in accordance with the invention contributes to high production yields of liquid crystal panels and increases reliability for providing high quality and fine resolution printing. Thus, a liquid crystal light valve in accordance with the invention can provide a light writing unit of high-performance and low-cost can be formed. The following is an example wherein such a printing device is formed utilizing a liquid crystal light valve in accordance with the invention.

Figure 24:
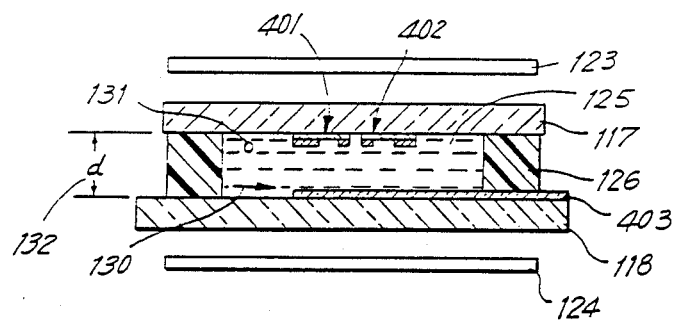
FIG. 24 is a cross-sectional view of a liquid crystal panel including an optical shutter constructed and arranged in accordance with the invention.

FIG. 24 illustrates in sectional view a liquid crystal panel utilized in this example. The structure of liquid crystal panel is basically the same as that illustrated in FIG. 3 and like elements are described by the same reference numerals. However, in FIG. 3 a single common electrode is utilized. In the device illustrated in FIG. 24, the common electrode is divided into two writing common electrodes 401 and 402 as illustrated in FIG. 7. The liquid crystal material utilized in this example is a nematic liquid crystal with 3 weight percent of 4-(2-methylbutyl)-4′-cyanobiphenyl as the additive. E silane is coated on the surface of one glass substrate and calcinated as an orientation material so that the liquid crystal molecules can orient in parallel with the glass substrate which has been rubbed with a degreased cotton cloth in a direction shown as 131 and 130. Direction 131 extends from a direction from the paper surface away from the viewer. The panel has a gap 132 illustrated as "d" having a range of from 5.1 through 5.5 μm with the liquid crystal material encapsulated therein.

The image is printed by utilizing the above-described liquid crystal panel. Atmospheric temperature of the liquid crystal light valve is controlled to within temperatures from about 35° C. to 40° C. A signal voltage $V_1$ is set at 30V, $f_L$ is applied at 2 KHz, $f_H$ is 120 KHz and $T_f$ is 2 msec. A high-luminance lamp including a fluorescent material of the formula $CeMgAl_{11}O_{19}: Tb^{3+}$ as a light source. A photo-sensitive material formed from Se with Te as a sensitizer is used. The surface speed of the photosensitive drum wherein the respective elements are positioned as illustrated in FIG. 1 is 5 cm/sec. When the signals in accordance with the invention are applied to the liquid crystal light valve of FIG. 24, the liquid crystal light valve operates by time-sharing signals in accordance with the invention for printing an image in response to the switching signals.

The above-described example illustrates one of the uses for a liquid crystal light valve prepared in accordance with the invention. In addition, the liquid crystal light valve prepared in accordance with the invention can be utilized as a light writing device other than in a printing device. There are many applications directed to a light printing device as explained below.

The time-sharing dynamic drive in accordance with the invention is based on the same principal utilized for driving an LED or a fluorescent display tube wherein the optical switching is performed within the time assigned for writing to an element of the display device. Thus, uses which require a response speed of elements within an assigned time for writing are possible.

Figure 25:
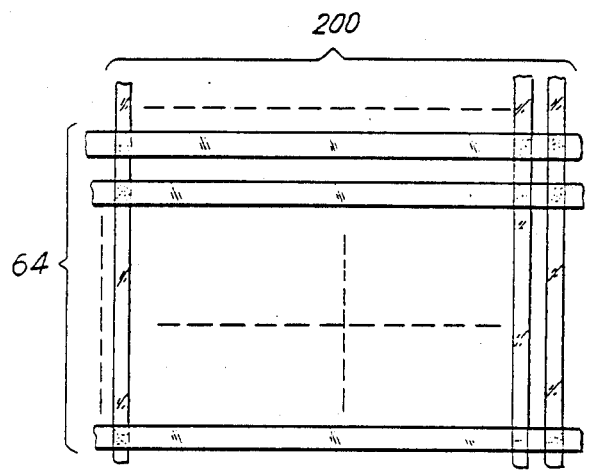
FIG. 25 is an illustration of a matrix liquid crystal display device including the liquid crystal panels constructed and arranged in accordance with the invention.
Figure 26:
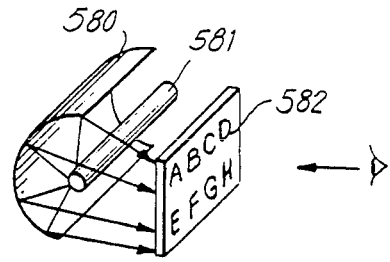
FIG. 26 is an illustration of a light source and liquid crystal light valve constructed and arranged in accordance with the invention.

FIG. 25 illustrates an example wherein a matrix liquid crystal display device is formed utilizing a liquid crystal device and driving method in accordance with the invention. A matrix including 5 by 8 dots is used for displaying 40 characters per line and 8 lines or a total of 11,200 picture elements. The dynamic drive is performed with 64 transverse selective signal electrodes, 200 longitudinal signal electrodes driven in 1/64 duty. The frequency utilized is 1.25 KHz, a repeating frequency of 1 frame is 19.5 Hz, or about 20 frames per second. The applied voltage is 30 V, $f_H = 100$ KHz, and $f_L = 1$ KHz. As only 1/64 picture elements are ON, the image is dark. Thus, depending on circumstances, it is desirable to position the light source at the back of the valve in order to strengthen the light transmitted. In this embodiment of the invention, wherein a fluorescent lamp of 30W and 100,000 cd/m² is utilized as shown in FIG. 26, satisfactory contrast for practical use can be obtained by positioning a reflective mirror 580 behind a fluorescent lamp 581 for illuminating a liquid crystal display device 582 constructed in accordance with the invention.

In the N time-sharing method in accordance with the invention, optical switching of the liquid crystal is completed during the selecting time $T_a$ which is defined by 1/N duty ratio within the repetitional period $T_f$ as shown in FIGS. 9-11. There are N common electrodes and the N time-sharing drive method applies the driving signals to the liquid crystal for completing the response only during the assigned time $T_a$ which is 1/N of the repetitional period $T_f$. N micro-shutters, for example 821-826 in FIG. 20 on one data signal electrode 813, are driven sequentially by applying time multiplex common electrode signals $C_1-C_N$ shown in FIG. 13 to the N common electrodes 801-806 shown in FIG. 20. Thus, the signal for selecting one of the common electrodes is the combination of two types of signals, namely a high frequency signal $f_H$ and a low frequency signal $f_L$. This selecting signal is applied during the selecting time $T_a$. The low frequency signal $f_L$ for defining the non-selecting time of this common electrode is applied during the non-selecting time $T_b$. $T_a$ is defined as the period 1/N of the repetitional period $T_f$. Tb is defined as the portion $(1-1/N)$ of the repetitional period $T_f$. In sum, optical switching of the liquid crystal is accomplished during selecting time $T_a$ which is 1/N $T_f$ defined by the duty ratio N. N micro-shutters are driven sequentially by applying time multiplex common electrode signals to N common electrodes which are opposed to one data signal electrode.

As stated above, a liquid crystal optical device in accordance with the invention can be driven in a time-sharing drive. The optical device is driven by a high-speed switching based upon different principals and utilized in conventional liquid crystal devices. Such optical devices prepared in accordance with the invention are thus suitable for a light printing device, a display device and the like.

It will thus be seen that the objects set forth above, among those made apparent from the preceding description, are efficiently attained and since certain changes may be made in carrying out the above process, in the described product, and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid crystal optical device for operation in a time-sharing manner to transmit light to a moving photosensitive surface, the liquid crystal device comprising:

liquid crystal cell means formed from a first transparent plate means and a cooperating second transparent plate means;

a plurality of N common electrode means disposed in spaced, parallel strips on the interior surface of the first transparent plate means to provide a plurality of M spaced regions for forming light micro-shutters;

a plurality of M cooperating signal electrode means disposed on the interior surface of the second transparent plate means substantially orthogonal to the common electrode means and in registration with the micro-shutter forming regions thereof and extending in a direction substantially parallel to the moving photosensitive surface, both N and M being integers, the transparent plate means being spaced apart from and substantially parallel to each other for forming a space therebetween and the transparent plate means being disposed so that the respective electrode means cross in plan view;

opaque means including transparent regions for defining micro-shutters located where the respective electrode means cross, there being M transparent regions diagonally offset from each other across the width of the signal electrode means and with respect to the crossed common electrode means, the transparent regions repeating along the signal electrode means at each crossing common electrode means so that the micro-shutters are disposed in a diagonal line which is substantially transverse to the direction of motion of an associated photo-sensitive surface, there being intervals of $L=(m+1/N)T_1 v$ between the centers of adjacent transparent regions of adjacent common electrodes, wherein v is the speed of transfer of the photo-sensitive surface, $T_1$ is a writing period, and m is an integer equal to or greater than 2;

liquid crystal means encapsulated in the space between the transparent plate means; and time sharing liquid crystal driving circuit means coupled to the N common and M signal electrode means for applying signals to the electrode means which optically switch the light micro-shutters, whereby transmission of light through the liquid crystal is stopped.

2. The liquid crystal optical device of claim 1 in which the opaque means is one of the electrode means.

3. The liquid crystal optical device of claim 1 wherein the signals applied by the timesharing liquid crystal driving circuit means to the N common and M signal electrode means includes a signal of low frequency $f_L$ within a period ("$T_f/N$").

4. The liquid crystal optical device of claim 1 in combination with a light source, a photo-sensitive member for receiving light from the light source which has passed through the liquid crystal cell means, developing means for developing an image formed by light striking the photo-sensitive member, a transfer section, and a fixing section, the combination comprising a light printing device.

* * * * *